United States Patent [19]

Kaneda et al.

[11] Patent Number: 5,680,211
[45] Date of Patent: Oct. 21, 1997

[54] APPARATUS FOR OPTICALLY DETECTING DISPLACEMENT OF AN OBJECT USING A SYNTHESIZING MEANS UTILIZING A SUBSTRATE WITH TWO DIFFRACTION GRATINGS THEREON

[75] Inventors: Yasushi Kaneda, Tokyo; Koh Ishizuka, Ohmiya; Hiroshi Kondo, Yokohama; Satoshi Ishii, Tokyo, all of Japan

[73] Assignee: Canon Kabushiki Kaisha, Tokyo, Japan

[21] Appl. No.: 525,249

[22] Filed: Sep. 8, 1995

Related U.S. Application Data

[63] Continuation of Ser. No. 169,396, Dec. 20, 1993, abandoned.

[30] Foreign Application Priority Data

Dec. 24, 1992 [JP] Japan .................................... 4-344575

[51] Int. Cl.$^6$ .................................. G01B 11/02; G01D 5/34; G01J 9/00
[52] U.S. Cl. ................ 356/356; 356/363; 250/237 G; 250/231.17
[58] Field of Search ................................... 356/356, 363; 250/237 G, 231.17

[56] References Cited

U.S. PATENT DOCUMENTS

| 4,176,276 | 11/1979 | Kaul et al. | 250/237 G |
|---|---|---|---|
| 4,433,585 | 2/1984 | Levine | 356/356 |
| 4,766,310 | 8/1988 | Michel | 250/237 G |
| 4,776,701 | 10/1988 | Pettigrew | 356/356 |
| 4,949,289 | 8/1990 | Stephens et al. | 364/577 |
| 4,955,718 | 9/1990 | Michel | 356/356 |
| 4,959,542 | 9/1990 | Stephens | 260/237 G |
| 4,983,828 | 1/1991 | Stephens | 250/237 G |
| 5,009,506 | 4/1991 | Spies | 356/356 |
| 5,015,835 | 5/1991 | Ohuchida et al. | 250/237 R |
| 5,026,164 | 6/1991 | Ichikawa | 250/337 G |
| 5,064,290 | 11/1991 | McMurtry et al. | 250/237 G |
| 5,067,816 | 11/1991 | Ichikawa | 356/273 |
| 5,127,733 | 7/1992 | Allgäuer | 356/356 |
| 5,214,280 | 5/1993 | Rieder et al. | 250/237 G |
| 5,216,478 | 6/1993 | Kadowaki et al. | 356/28.5 |
| 5,283,434 | 2/1994 | Ishizuka et al. | 250/237 G |
| 5,327,218 | 7/1994 | Igaki | 356/356 |

FOREIGN PATENT DOCUMENTS

| 0333929 | 9/1989 | European Pat. Off. . |
| 0463561 | 1/1992 | European Pat. Off. . |
| 0486050 | 5/1992 | European Pat. Off. . |
| 0509979 | 10/1992 | European Pat. Off. . |
| 1307926 | 12/1989 | Japan . |
| 90-13006 | 11/1990 | WIPO . |

*Primary Examiner*—David C. Nelms
*Assistant Examiner*—Jason D. Vierra Eisenberg
*Attorney, Agent, or Firm*—Fitzpatrick, Cella, Harper & Scinto

[57] ABSTRACT

A displacement detection apparatus includes a light source (1), a first diffraction grating (G1) which is arranged on the same substrate as a second diffraction grating (G2) so as to diffract and split light emitted from the light source and to irradiate ±1st-order diffracted light beams onto the second diffraction grating (G2), a third diffraction grating (G3) for synthesizing a +1st-order reflectively diffracted light beam generated by reflectively diffracting the +1st-order diffracted light beam by the second diffraction grating, and a −1st-order reflectively diffracted light beam generated by reflectively diffracting the +1st-order diffracted light beam by the second diffraction grating to form interference light, and a light-receiving element (3) for converting the interference light into a signal representing a displacement of the substrate.

23 Claims, 15 Drawing Sheets

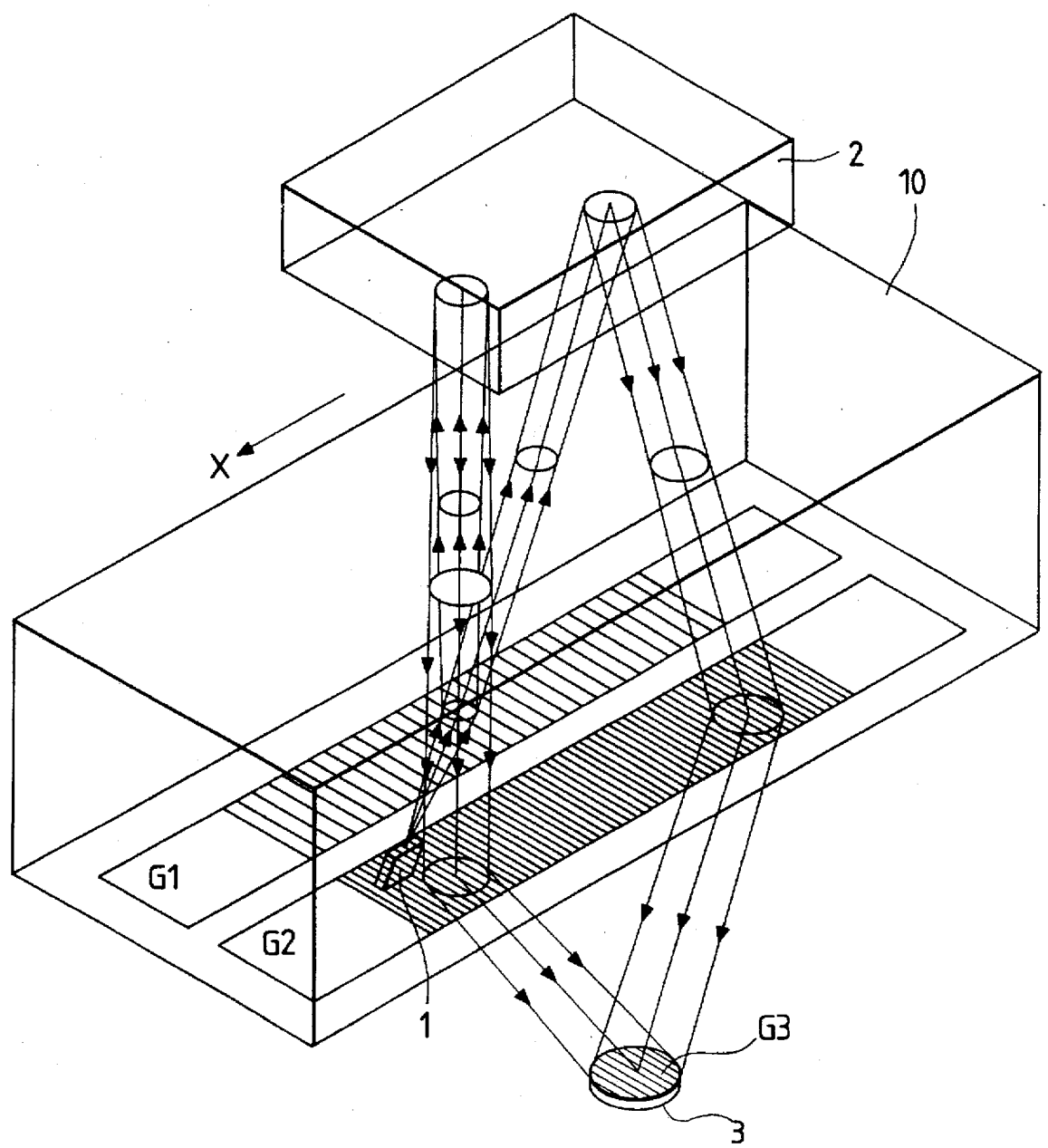

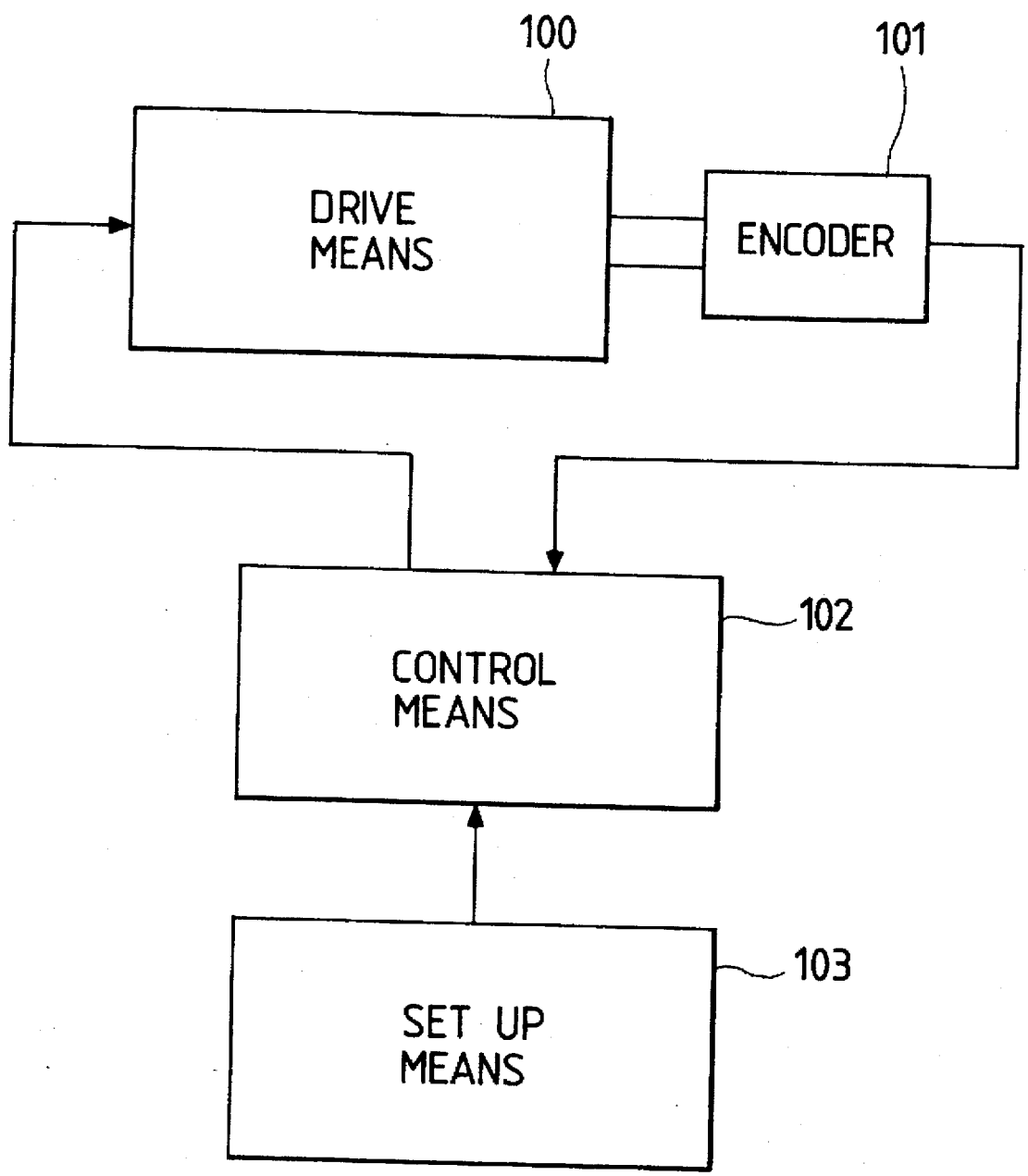

APPARATUS FOR OPTICALLY DETECTING DISPLACEMENT OF AN OBJECT USING A SYNTHESIZING MEANS UTILIZING A SUBSTRATE WITH TWO DIFFRACTION GRATINGS THEREON

This application is a continuation, of application Ser. No. 08/169,396 filed Dec. 20, 1993, now abandoned.

BACKGROUND OF THE INVENTION

1. Field of the Invention

The present invention relates to an apparatus for optically detecting a displacement (a moving amount, rotational amount, velocity, and acceleration) of an object and, more particularly, to an encoder, a velocity sensor, an acceleration sensor, and the like.

2. Related Background Art

Optical displacement sensors such as an optical encoder, a laser Doppler velocimeter, a laser interferometer, and the like for obtaining a displacement of an object with high precision by irradiating light onto the object have been widely used in the fields of NC machine tools, OA equipment, robots, precision manufacturing apparatuses, and the like.

In one of such displacement sensors, 0th- and 1st-order diffracted light beams obtained by diffracting a laser beam by a first diffraction grating are irradiated onto a second diffraction grating formed on a scale. A +1st-order reflectively diffracted light beam generated by reflectively diffracting the 0th-order diffracted light beam by the second diffraction grating, and a −1st-order reflectively diffracted light beam generated by reflectively diffracting the 1st-order diffracted light beam by the second diffraction grating are directed toward a third diffraction grating arranged near the first diffraction grating. The third diffraction grating synthesizes the +1st- and −1st-order reflectively diffracted light beams to form an interference light beam, and the interference light beam is photoelectrically converted to obtain a sine wave signal representing the displacement of the scale.

In the above-mentioned displacement sensor, since the first and second diffraction gratings are supported by different members, the parallelness between the first and second diffraction gratings is low, and the incident positions of the +1st- and −1st-order reflectively diffracted light beams on the third diffraction grating cannot coincide with each other, resulting in a low intensity of the interference light beam. Therefore, the sine wave signal obtained by photoelectric conversion has a low S/N ratio.

SUMMARY OF THE INVENTION

In order to solve the above-mentioned problem, there is provided according to the present invention a displacement detection apparatus which comprises irradiation means for irradiating two beams obtained by splitting an irradiation beam onto a second diffraction grating on a substrate, synthesizing means for synthesizing a first diffracted beam generated by the second diffraction grating upon irradiation of one beam, and a second diffracted beam generated by the second diffraction grating upon irradiation of the other beam, and means for receiving an interference beam formed by synthesizing the first and second diffracted beams, and converting the interference beam into a signal representing a displacement of the substrate, wherein the irradiation means comprises a first diffraction grating, and the first diffraction grating is arranged on a surface of the substrate where the second diffraction grating is formed or another surface thereof facing parallel to the surface.

According to a preferred aspect of the present invention, the synthesizing means comprises a third diffraction grating for achieving the synthesis, and if grating pitches of the first, second, and third diffraction gratings are represented by P1, P2, and P3, the grating pitches substantially satisfy the following condition:

$$|P1-P2| \cdot P3 = P1 \cdot P2$$

According to another preferred aspect of the present invention, the second diffraction grating is designed to reflectively diffract the two beams, and the second diffraction grating is formed on a surface of the substrate facing the third diffraction grating.

According to still another preferred aspect of the present invention, the second diffraction grating is designed to reflectively diffract the two beams, and the second diffraction grating is formed on a surface of the substrate opposite to a surface of said substrate facing the third diffraction grating.

According to still another preferred aspect of the present invention, the second diffraction grating is designed to transmit the two beams, and the second diffraction grating is formed on a surface of the substrate facing the third diffraction grating.

According to still another preferred aspect of the present invention, the second diffraction grating is designed to transmit the two beams, and the second diffraction grating is formed on a surface of the substrate opposite to a surface of said substrate facing the third diffraction grating.

BRIEF DESCRIPTION OF THE DRAWINGS

FIGS. 2A and 2B are explanatory views showing the first embodiment of the present invention, in which FIG. 2A is a front view, and FIG. 2B is a side view;

FIGS. 4A and 4B are explanatory views showing the second embodiment of the present invention, in which FIG. 4A is a front view, and FIG. 4B is a side view;

FIGS. 6A and 6B are explanatory views showing the third embodiment of the present invention, in which FIG. 6A is a front view, and FIG. 6B is a side view;

FIGS. 8A and 8B are explanatory views showing the fourth embodiment of the present invention, in which FIG. 8A is a front view, and FIG. 8B is a side view;

FIG. 9 is a schematic perspective view showing the fifth embodiment of the present invention;

FIGS. 10A and 10B are explanatory views showing the fifth embodiment of the present invention, in which FIG. 10A is a front view, and FIG. 10B is a side view;

FIGS. 12A and 12B are explanatory views showing the sixth embodiment of the present invention, in which FIG. 12A is a front view, and FIG. 12B is a side view;

FIGS. 14A and 14B are explanatory views showing the seventh embodiment of the present invention, in which FIG. 14A is a front view, and FIG. 14B is a side view; and FIG. 15 is a block diagram showing an example of a drive system comprising the displacement detection apparatus of the present invention.

DETAILED DESCRIPTION OF THE PREFERRED EMBODIMENTS

Figure 1:
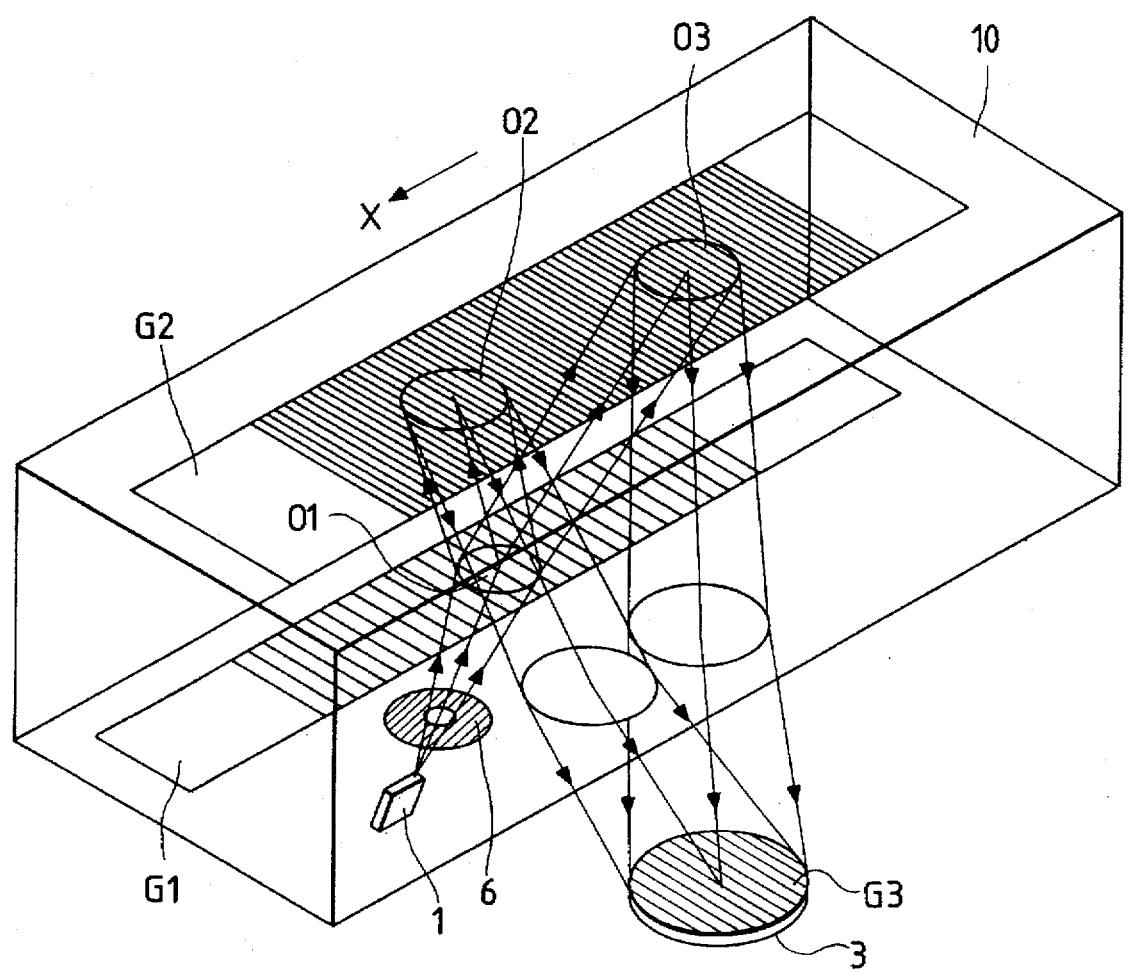
FIG. 1 is a schematic perspective view showing the first embodiment of the present invention.
Figure 2A:
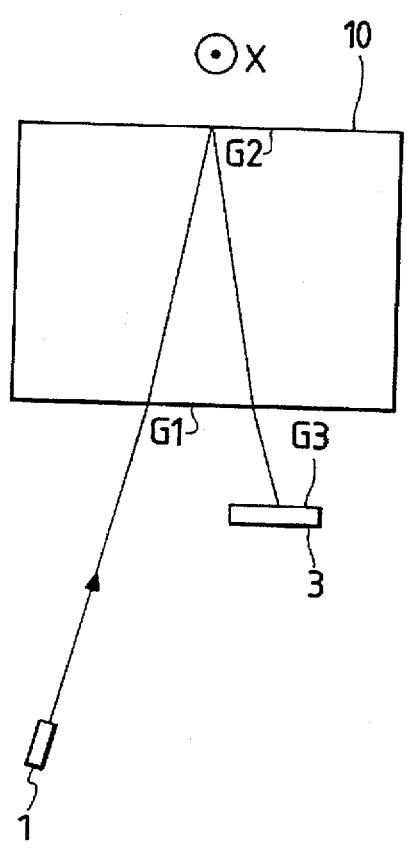
Figure 2B:
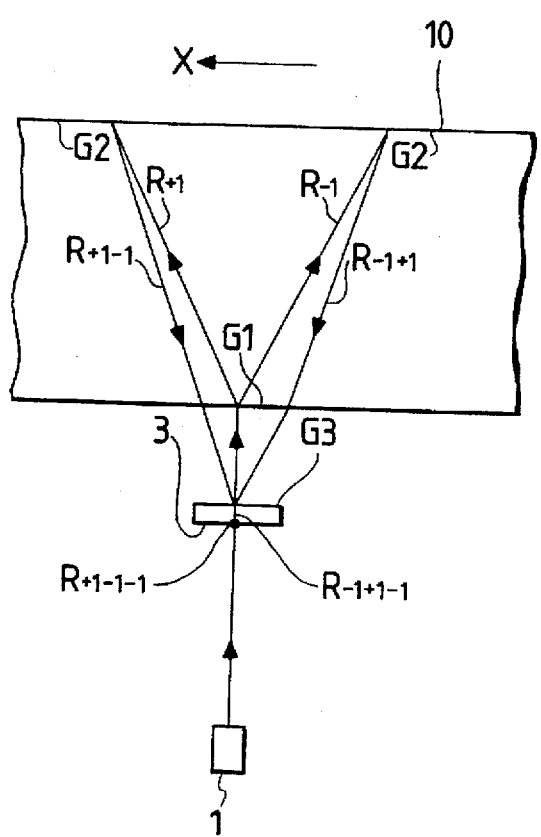

FIG. 1 is a schematic perspective view showing the first embodiment of the present invention, and FIGS. 2A and 2B are respectively a front view and a side view of an apparatus shown in FIG. 1.

The apparatus of this embodiment comprises a light-emitting element 1 such as a light-emitting diode, a laser diode, or the like, a light-receiving element 3 for photoelectrically converting an interference beam, and outputting a displacement detection signal (sine wave signal), a first diffraction grating G1 for splitting a divergent light beam emitted from the light-emitting element 1, a second diffraction grating G2, having a grating pitch different from that of the first diffraction grating G1, for deflecting the split divergent light beams by reflectively diffracting the light beams, a third diffraction grating G3, formed on a light-receiving portion of the light-receiving element 3, for synthesizing the light beams, a mask 6 arranged between the light-emitting element 1 and the first diffraction grating G1 to intercept unnecessary light components, and a scale 10 in which the diffraction grating G1 is formed on one surface, on the side of the members 1, 3, 6, and G3, of a transparent parallel plate, and the diffraction grating G2 is formed on the opposite surface of the transparent parallel plate. A portion of the divergent light beam emitted from the light-emitting element 1 passes through the mask 6, and the passed light beam is subjected to phase modulation, i.e., is diffracted at a point 01 of the diffraction grating G1 on the surface, on the side of the element 1, of the scale 10, and is split into +1st- and −1st-order diffracted light beams R+1 and R−1. The phase of the +1st-order diffracted light beam R+1 is shifted by +2πx/P1, and the phase of the −1st-order diffracted light beam R−1 is shifted by −2πx/P1 (where x is the moving distance of the scale).

The +1st-order diffracted light beam R+1 becomes incident on a point 02 of the diffraction grating G2 formed on the surface, opposite to the surface on which the diffraction grating G1 is formed, of the scale 10, and is reflectively diffracted and split into a −1st-order diffracted light beam R+1−1 and other light beams. The −1st-order diffracted light beam R−1 becomes incident on a point 03 of the diffraction grating G2, and is reflectively diffracted and split into a +1st-order diffracted light beam R−1+1 and other light beams. The phase of the −1st-order diffracted light beam R+1−1 from the point 02 is shifted by −2πx/P2 by diffraction at the point 02, and becomes 2πx(1/P1−1/P2). The phase of the +1st-order diffracted light beam R−1+1 is shifted by 2πx/P2 by diffraction at the point 03, and becomes 2πx(−1/P1+1/P2). The −1st-order diffracted light beam R+1−1 becomes incident on the diffraction grating G3 of the light-receiving element 3, is transmissively diffracted by the diffraction grating G3, and is split into a −1st-order diffracted light beam R+1−1−1, and other light beams. The +1st-order diffracted light beam R−1+1 becomes incident on the diffraction grating G3 of the light-receiving element 3, is transmissively diffracted by the diffraction grating G3, and is split into a −1st-order diffracted light beam R−1+1−1, and other light beams. Of the transmissively diffracted light beams, the −1st-order diffracted light beams R+1−1−1 and R−1+1−1 which are synthesized by overlapping their optical paths become incident on the light-receiving element 3 as an interference light beam. The phase of the interference light beam at this time is given by:

$$2\pi x(1/P1-1/P2)-2\pi x(-1/P1+1/P2)=4\pi x(1/P1-1/P2)=4\pi x/P3$$

Thus, every time the first and second diffraction gratings G1 and G2 on the scale 10 simultaneously move by a pitch ½ of that of the third diffraction grating G3, a brightness change for one period occurs.

In this embodiment, when the pitches of the three diffraction gratings G1, G2, and G3 are respectively represented by P1, P2, and P3, the diffraction gratings G1, G2, and G3 are designed to satisfy a condition P3=P1·P2/|P1−P2| (e.g., P1=4 μm, P2=2 μm, and P3=4 μm). Thus, as can be seen from the above description, an encoder with a resolution of 2 μm can be realized.

In this embodiment, the first and second diffraction gratings G1 and G2 are separately formed on the opposite parallel surfaces of the transparent parallel-plate substrate 10, and the parallelness between the first and second diffraction gratings G1 and G2 is high since they are formed on the parallel surfaces of the common substrate, resulting in a high detection sensitivity (S/N ratio).

The apparatus of this embodiment has a very simple interference optical system arrangement. When the two diffraction gratings G1 and G2 are formed on the two surfaces of a glass (scale 10) by, e.g., a replica method, a compact, simple-structured, and inexpensive encoder can be realized. Since a head portion is constituted by only the light-emitting element 1 and the light-receiving element 3 with the third diffraction grating G3, the number of components is small, and assembling is easy, thus providing a very compact, low-cost encoder. When the diffraction grating G1 comprises a phase grating, and a depth d of the steps of the grating is set to satisfy d=λ/{2(n−1)} (n is the refractive index of the grating, and λ is the wavelength), 0th-order light can be almost eliminated from light beams diffracted and split by the diffraction grating G1, and only ±1st-order diffracted light beams can be obtained.

Figure 3:
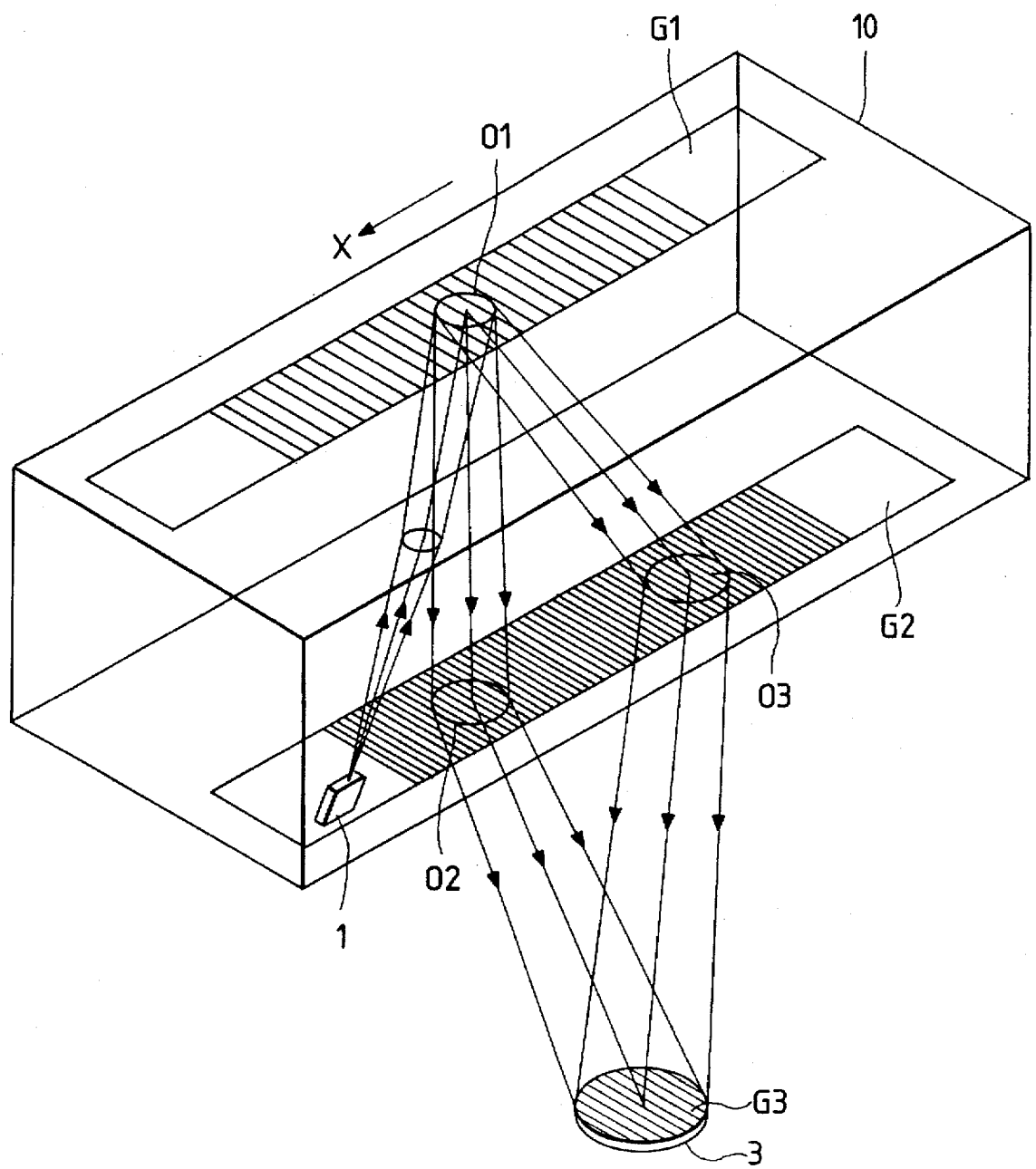
FIG. 3 is a schematic perspective view showing the second embodiment of the present invention.
Figure 4A:
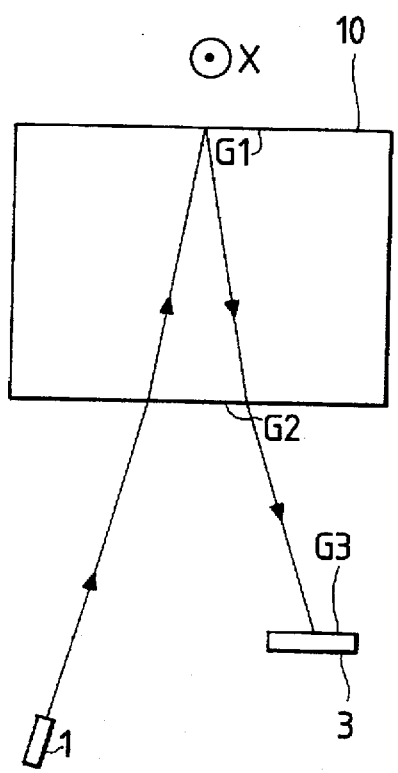
Figure 4B:
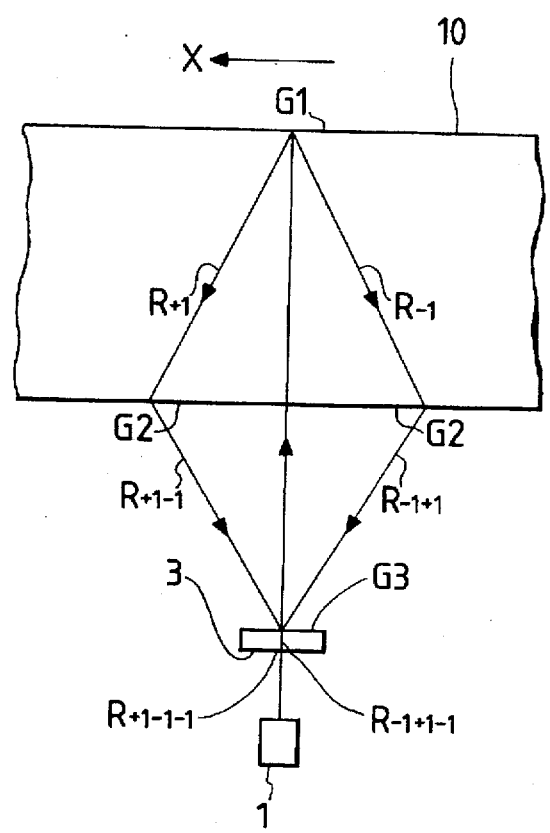

FIG. 3 is a schematic perspective view showing the second embodiment of the present invention, and FIGS. 4A and 4B are respectively a front view and a side view of an apparatus shown in FIG. 3.

The apparatus of this embodiment comprises a light-emitting element 1 such as a light-emitting diode, a laser diode, or the like, a light-receiving element 3 for photoelectrically converting an interference beam, and outputting a displacement detection signal (sine wave signal), a first diffraction grating G1 for splitting a divergent light beam emitted from the light-emitting element 1, a second diffraction grating G2, having a grating pitch different from that of the first diffraction grating G1, for deflecting the split divergent light beams by reflectively diffracting the light beams, a third diffraction grating G3, formed on a light-receiving portion of the light-receiving element 3, for synthesizing the light beams, and a scale 10 in which the diffraction grating G1 is formed on one surface, on the side opposite to the members 1, 3, and G3, of a transparent parallel plate, and the diffraction grating G2 is formed on the other surface, on the side of the members 1, 3, and G3, of the transparent parallel plate.

Since the basic principle for forming an interference beam in this embodiment is the same as that in the above embodiment, and can be easily understood from the optical path diagrams of FIGS. 4A and 4B, a detailed description thereof will be omitted.

This embodiment, as well, can provide the same effect as that in the above embodiment. As shown in FIG. 3, the diffraction gratings G1 and G2 on the scale are arranged on the opposite sides of the scale to assure the distance between the scale and the head. In the preferred aspect of this embodiment, grating pitches P1, P2, and P3 of the diffraction gratings G1, G2, and G3 satisfy a condition P3=P1·P2/|P1−P2|.

Figure 5:
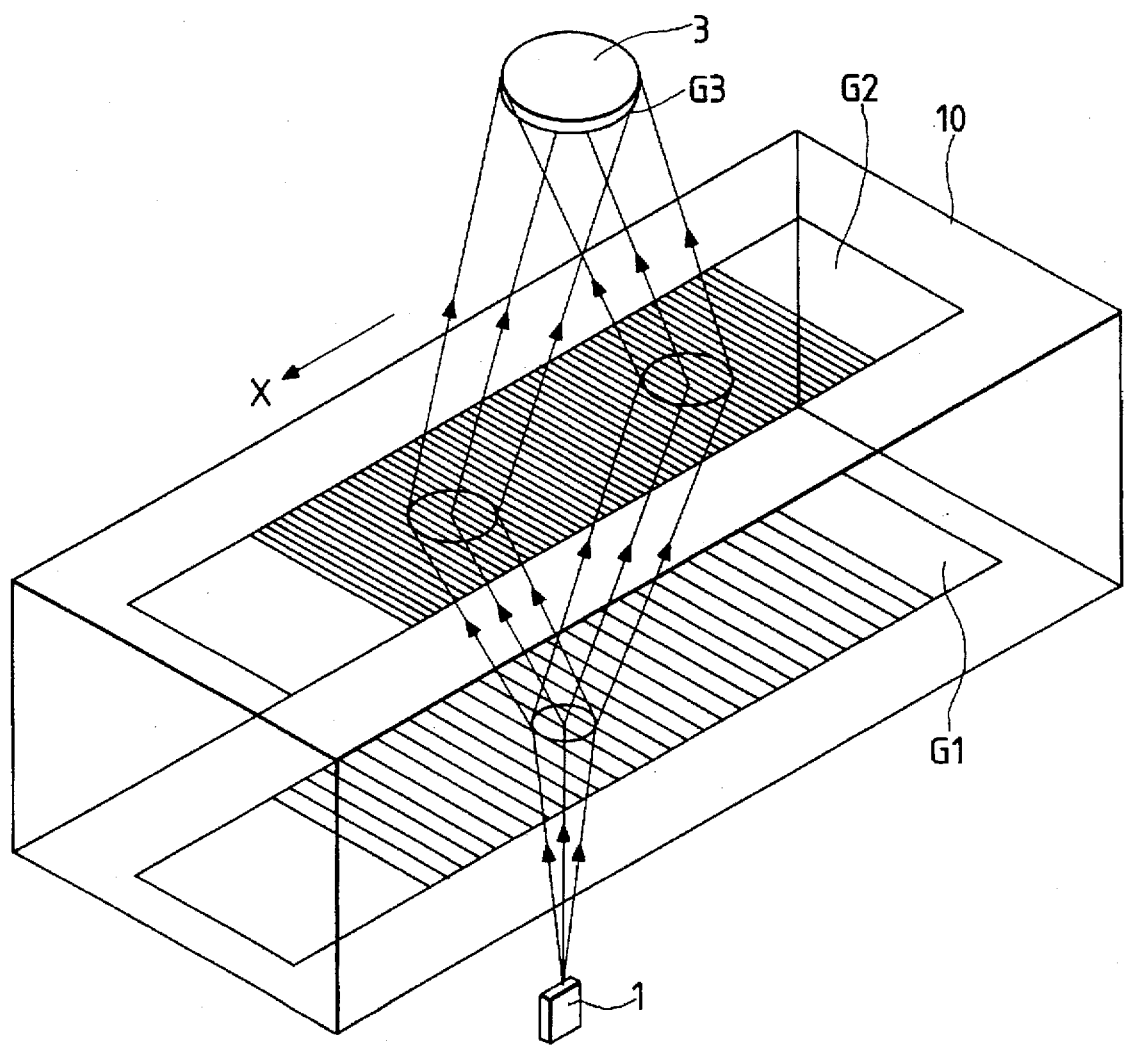
FIG. 5 is a schematic perspective view showing the third embodiment of the present invention.
Figure 6A:
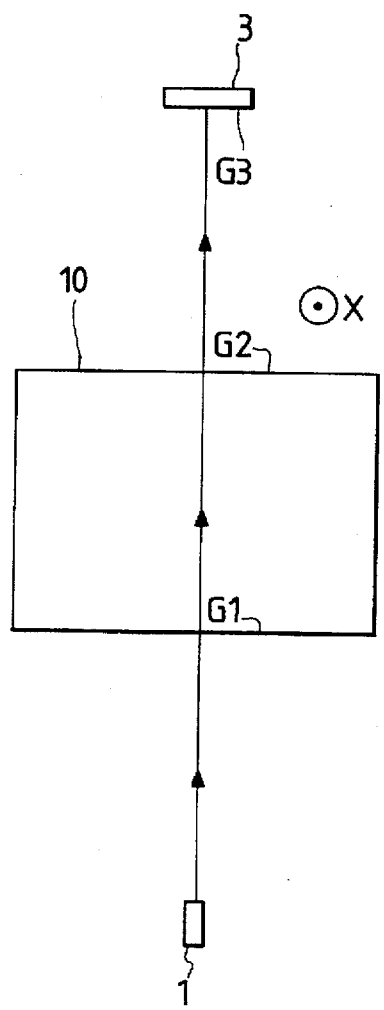
Figure 6B:
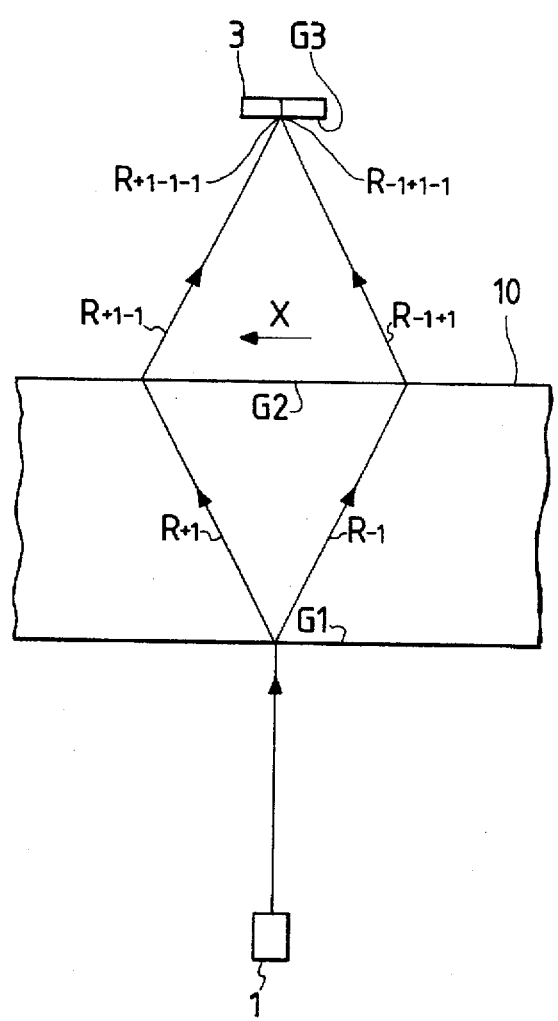

FIG. 5 is a schematic perspective view showing the third embodiment of the present invention, and FIGS. 6A and 6B are respectively a front view and a side view of an apparatus shown in FIG. 5.

The apparatus of this embodiment comprises a light-emitting element 1 such as an LED, a laser diode, or the like, a light-receiving element 3 for photoelectrically converting an interference light beam, and outputting a displacement detection signal, a first diffraction grating G1 for splitting a divergent light beam emitted from the light-emitting element 1, a second diffraction grating G2, having a grating pitch different from that of the first diffraction grating, for deflecting the split divergent light beams by transmissively diffracting the light beams, a third diffraction grating G3, formed on a light-receiving portion of the light-receiving element 3, for synthesizing the light beams, and a scale 10 in which the diffraction grating G1 is formed on one surface, on the side of the member 1, of a transparent parallel plate, and the diffraction grating G2 is formed on the other surface, on the side of the members 3 and G3, of the transparent parallel plate.

Since the basic principle for forming an interference beam in this embodiment is the same as that in the above embodiments, and can be easily understood from the optical path diagrams of FIGS. 6A and 6B, a detailed description thereof will be omitted.

In the preferred aspect of this embodiment, grating pitches P1, P2, and P3 of the diffraction gratings G1, G2, and G3 satisfy a condition P3=P1·P2/|P1−P2|.

This embodiment can also provide the same effect as that in the above embodiments.

Figure 7:
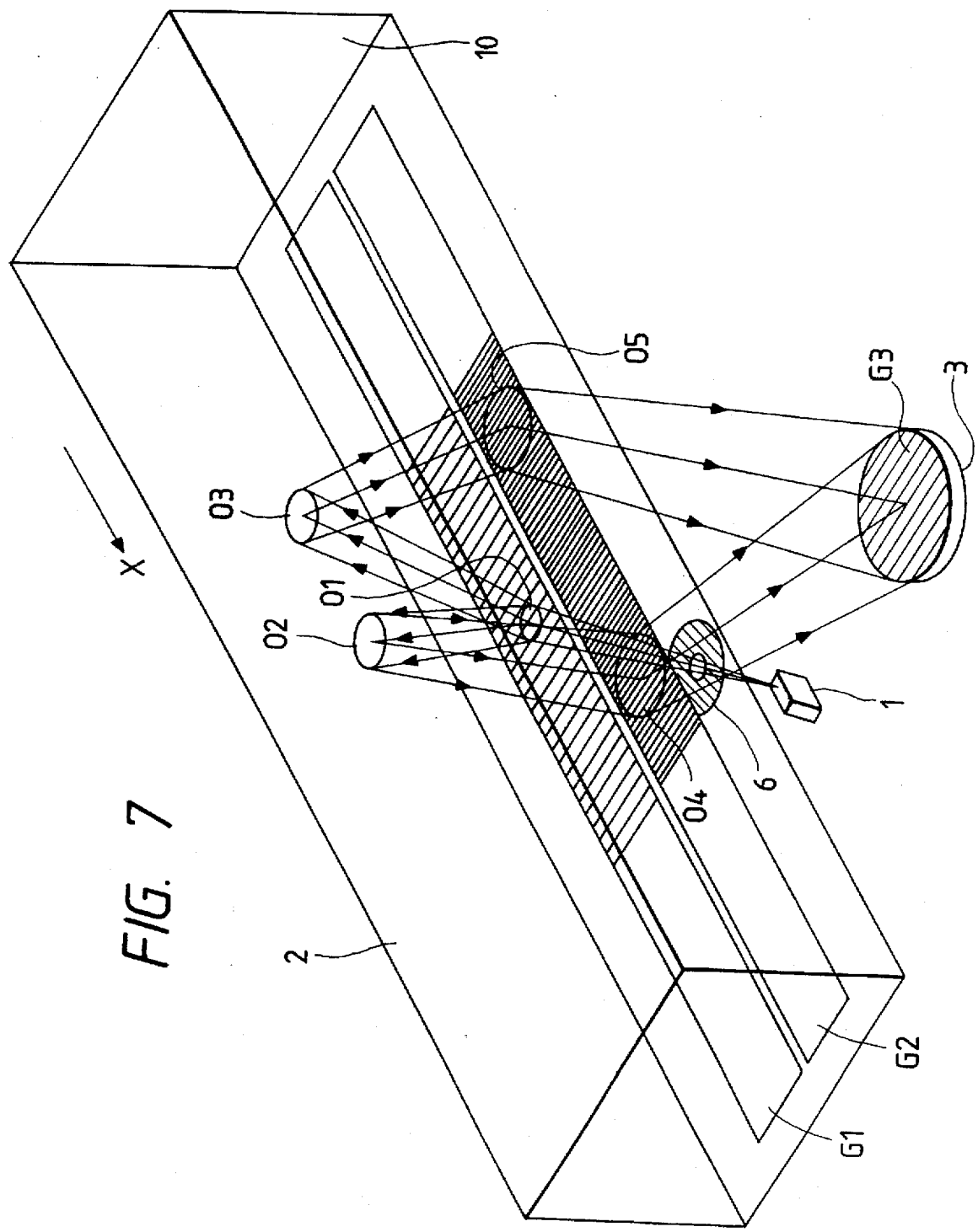
FIG. 7 is a schematic perspective view showing the fourth embodiment of the present invention.
Figure 8A:
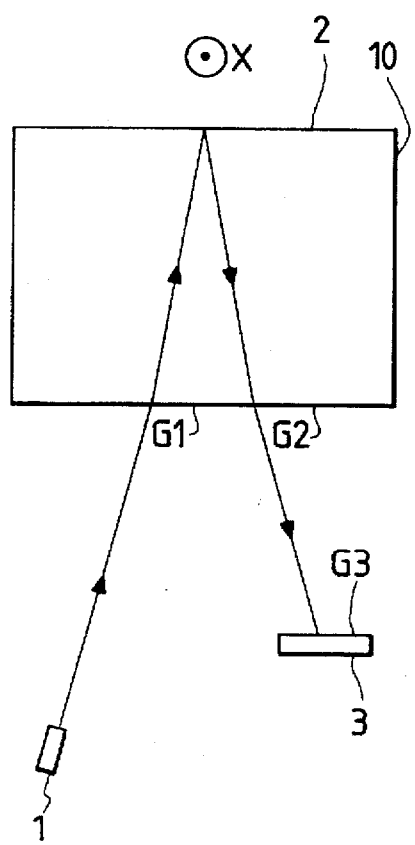
Figure 8B:
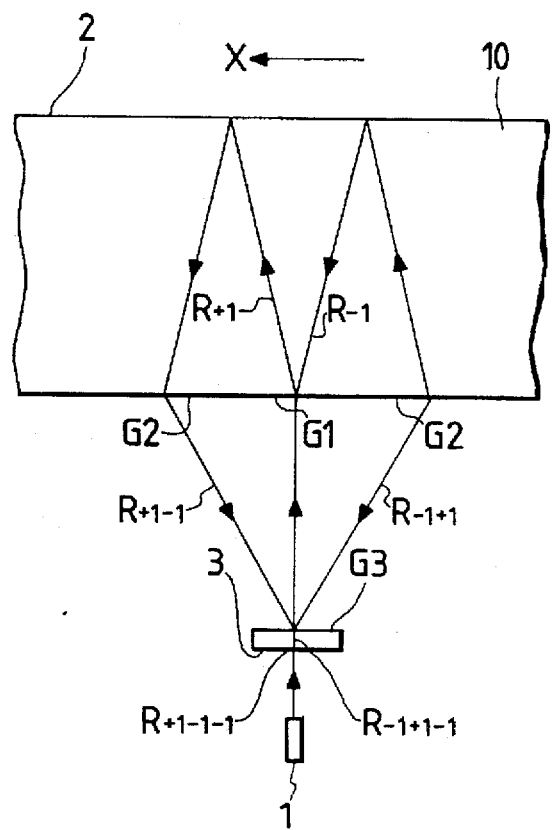

FIG. 7 is a schematic perspective view showing the fourth embodiment of the present invention, and FIGS. 8A and 8B are respectively a front view and a side view of an apparatus shown in FIG. 7.

The apparatus of this embodiment comprises a light-emitting element 1 such as an LED, a laser diode, or the like, a mirror surface 2, a light-receiving element 3 for photoelectrically converting an interference light beam, and outputting a displacement detection signal (sine wave signal), a first diffraction grating G1 for splitting a divergent light beam emitted from the light-emitting element 1, a second diffraction grating G2, having a grating pitch different from that of the first diffraction grating, for deflecting the split divergent light beams by transmissively diffracting the light beams, a third diffraction grating G3, formed on a light-receiving portion of the light-receiving element 3, for synthesizing light beams, a mask 6, arranged between the light-emitting element 1 and a scale 10, for intercepting unnecessary light components, and the scale 10 which has the diffraction gratings G1 and G2 on a surface, on the side of the light-emitting element 1 and the light-receiving element 3, of a transparent parallel plate, and has the mirror surface 2 on the opposite surface.

A portion of the divergent light beam emitted from the light-emitting element i passes through the mask 6, and undergoes phase modulation, i.e., is diffracted and split into +1st- and −1st-order diffracted light beams R+1 and R−1 at a point 01 on the diffraction grating G1 on the surface of the scale 10. The phase of the +1st-order diffracted light beam R+1 is shifted by $+2\pi x/P1$, and the phase of the −1st-order diffracted light beam R−1 is shifted by $-2\pi x/P1$ (where x is the moving distance of the scale).

The +1st-order diffracted light beam R+1 is reflected by a point 02 on the mirror surface 2, on the side opposite to the diffraction grating G1, of the scale 10, and becomes incident on a point 04 of the diffraction grating G2. The +1st-order diffracted light beam R+i is transmissively diffracted by the diffraction grating G2, and is split into a −1st-order diffracted light beam R+1−1 and other light beams. Also, the −1st-order diffracted light beam R−1 is reflected by a point 03 on the mirror surface 2, on the side opposite to the diffraction grating G1, of the scale 10, and becomes incident on a point 05 of the diffraction grating G2. The −1st-order diffracted light beam R−1 is transmissively diffracted by the diffraction grating G2, and is split into a +1st-order diffracted light beam R−1+1 and other light beams. The phase of the −1st-order diffracted light beam R+1−1 is shifted by $-2\pi x/P2$ by diffraction at the point 04, and becomes $2\pi x(1/P1-1/P2)$. The phase of the +1st-order diffracted light beam R−1+1 is shifted by $2\pi x/P2$ by diffraction at the point 05, and becomes $2\pi x(-1/P1+1/P2)$. The −1st-order diffracted light beam R+1−1 becomes incident on and is transmissively diffracted by the diffraction grating G3, and is split into a −1st-order diffracted light beam R+1−1−1 and other light beams. Also, the +1st-order diffracted light beam R−1+1 becomes incident on and is transmissively diffracted by the diffraction grating G3, and is split into a −1st-order diffracted light beam R−1+1−1 and other light beams. Of the transmissively diffracted light beams, the diffracted light beams R+1−1−1 and R−1+1−1 which are synthesized by overlapping their optical paths become incident on the light-receiving element 3 as an interference light beam. The phase of the interference light beam at this time is given by:

$$2\pi x(1/P1 - 1/P2) - 2\pi x(-1/P1 + 1/P2) = 4\pi x(1/P1 - 1/P2)$$
$$= 4\pi x/P3$$

Thus, every time the first and second diffraction gratings G1 and G2 on the scale 10 simultaneously move by a pitch ½ of that of the third diffraction grating G3, a brightness change for one period occurs.

In this embodiment, when the pitches of the three diffraction gratings G1, G2, and G3 are respectively represented by P1, P2, and P3, the diffraction gratings G1, G2, and G3 are designed to satisfy a condition P3=P1·P2/|P1−P2|. For example, if P1=4 μm, P2=2 μm, and P3=4 μm, an encoder with a resolution of 2 μm can be realized.

In this embodiment, the first and second diffraction gratings G1 and G2 are separately formed on a single surface of a transparent parallel-plate substrate (scale 10), and the parallelness between the first and second diffraction gratings G1 and G2 is high, resulting in a high detection sensitivity (S/N ratio).

The apparatus of this embodiment has a very simple interference optical system arrangement. When the two diffraction gratings G1 and G2 are formed on a single surface of a glass (scale 10) by, e.g., a replica method, the manufacture of diffraction gratings is facilitated. Since the diffraction gratings G1 and G2 are formed on a single surface, the head portion and the scale 10 can be easily mounted. When the diffraction grating G1 comprises a phase grating, and a depth d of the steps of the grating is set to satisfy $d=\lambda/\{2(n-1)\}$, 0th-order light can be almost eliminated from light beams diffracted and split by the diffraction grating G1, and only ±1st-order diffracted light beams can be obtained (n is the refractive index of the grating, and λ is the central wavelength of light emitted from the light-emitting element 1).

Figure 10A:
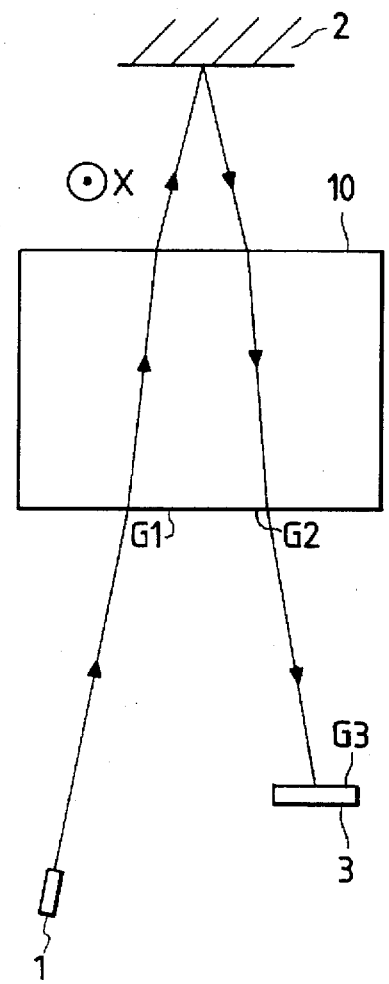
Figure 10B:
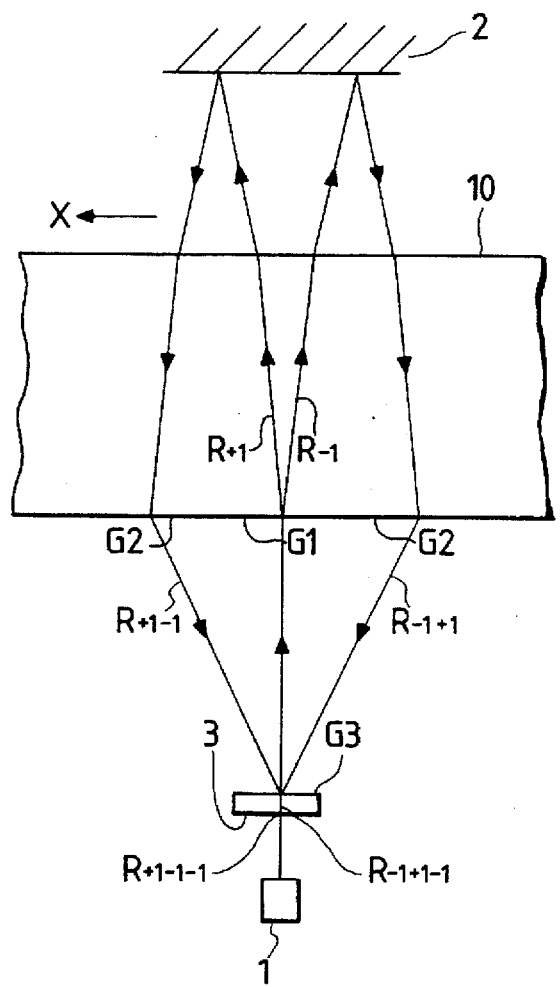

FIG. 9 is a schematic perspective view showing the fifth embodiment of the present invention, and FIGS. 10A and 10B are respectively a front view and a side view of an apparatus shown in FIG. 9.

The apparatus of this embodiment comprises a light-emitting element I such as a laser diode, a light-emitting diode, or the like, a mirror 2 separately arranged above a scale 10, a light-receiving element 3 for photoelectrically converting an interference light beam, and outputting a displacement detection signal, a first diffraction grating G1 for splitting a divergent light beam emitted from the light-emitting element 1, a second diffraction grating G2, having a grating pitch different from that of the first diffraction grating G1, for deflecting the split divergent light beams by transmissively diffracting the light beams, a third diffraction grating G3 for synthesizing light beams, and the scale 10 in which the first and second diffraction gratings G1 and G2 are formed on a surface, on the side of the light-emitting element 1 and the light-receiving element 3, of a transparent parallel plate.

Since the basic principle for forming an interference beam in this embodiment is the same as that in the above-mentioned fourth embodiment, and can be easily understood from the optical path diagrams of FIGS. 10A and 10B, a detailed description thereof will be omitted.

In the preferred aspect of this embodiment, grating pitches P1, P2, and P3 of the diffraction gratings G1, G2, and G3 satisfy a condition P3=P1·P2/|P1−P2|.

This embodiment can also provide the same effect as that in the fourth embodiment.

Figure 11:
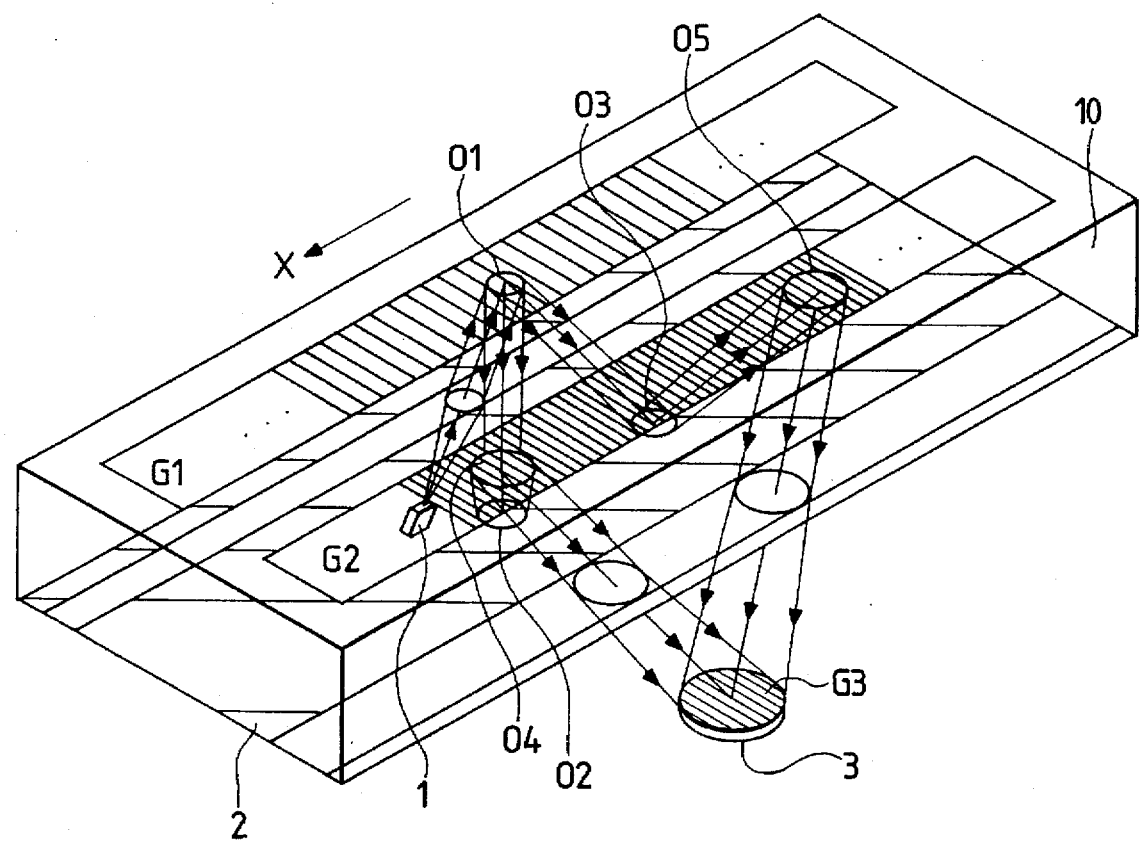
FIG. 11 is a schematic perspective view showing the sixth embodiment of the present invention.
Figure 12A:
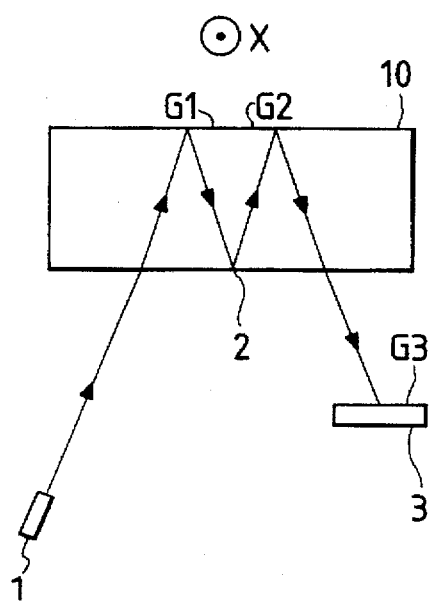
Figure 12B:
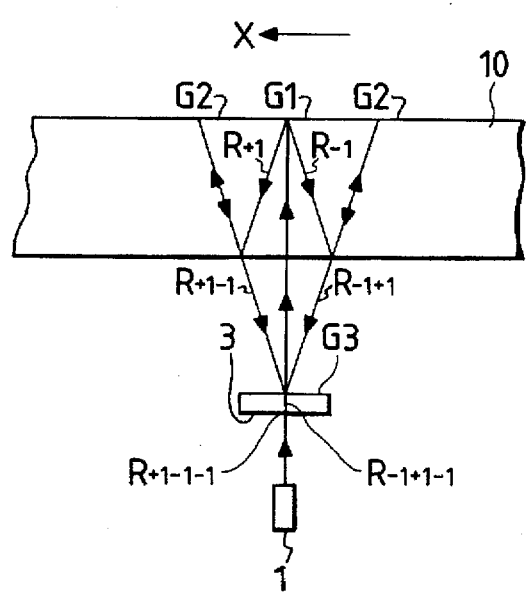

FIG. 11 is a schematic perspective view showing the sixth embodiment of the present invention, and FIGS. 12A and 12B are respectively a front view and a side view of an apparatus shown in FIG. 11.

The apparatus of this embodiment comprises a light-emitting element 1 such as a semiconductor laser, an LED, or the like, a mirror 2 formed on the surface, on the side of the light-emitting element 1, of a scale 10, a light-receiving element 3 for detecting a displacement detection signal by photoelectrically converting an interference light beam, a first diffraction grating G1 for splitting a divergent light beam emitted from the light-emitting element 1, a second diffraction grating G2, having a grating pitch different from that of the first diffraction grating G1, for deflecting the split divergent light beams by reflectively diffracting the light beams, a third diffraction grating G3, formed on a light-receiving portion of the light-receiving element 3, for synthesizing light beams, and the scale 10 in which the first and second diffraction gratings G1 and G2 are formed on a surface, on the side opposite to the light-emitting element 1 and the light-receiving element 3, of a transparent parallel plate. A portion of the divergent light beam emitted from the light-emitting element 1 passes through a mask 6, and the passed light beam is subjected to phase modulation, i.e., is reflectively diffracted at a point 01 of the diffraction grating G1 on the rear surface of the scale 10, and is split into +1st- and −1st-order diffracted light beams R+1 and R−1. The phase of the +1st-order diffracted light beam R+1 is shifted by $+2\pi x/P1$, and the phase of the −1st-order diffracted light beam R−1 is shifted by $-2\pi x/P1$ (where x is the moving distance of the scale).

The +1st-order diffracted light beam R+1 is reflected by a point 02 on the mirror surface 2 formed on the front surface of the scale 10, and becomes incident on a point 04 of the diffraction grating G2. The +1st-order diffracted light beam R+1 is transmissively diffracted by the diffraction grating G2, and is split into a −1st-order diffracted light beam R+1−1 and other light beams. Also, the −1st-order diffracted light beam R−1 is reflected by a point 03 on the mirror surface 2 formed on the front surface of the scale 10, and becomes incident on a point 05 of the diffraction grating G2. The −1st-order diffracted light beam R−1 is transmissively diffracted by the diffraction grating G2, and is split into a +1st-order diffracted light beam R−1+1 and other light beams. The phase of the −1st-order diffracted light beam R+1−1 is shifted by $-2\pi x/P2$ by diffraction at the point 04, and becomes $2\pi x(1/P1-1/P2)$. The phase of the 1st-order diffracted light beam R−1+1 is shifted by $2\pi x/P2$ by diffraction at the point 05, and becomes $2\pi x(-1/P1+1/P2)$. The −1st-order diffracted light beam R+1−1 becomes incident on and is transmissively diffracted by the diffraction grating G3, and is split into a −1st-order diffracted light beam R+1−1−1 and other light beams. Also, the +1st-order diffracted light beam R−1+1 becomes incident on and is transmissively diffracted by the diffraction grating G3, and is split into a −1st-order diffracted light beam R−1+1−1 and other light beams. Of the transmissively diffracted light beams, the diffracted light beams R+1−1−1 and R−1+1−1 which are synthesized by overlapping their optical paths become incident on the light-receiving element 3 as an interference light beam. The interference phase at this time is given by:

$$2\pi x(1/P1-1/P2)-2\pi x(-1/P1+1/P2)=4\pi x(1/P1-1/P2)$$

Thus, every time the first and second diffraction gratings G1 and G2 on the scale 10 simultaneously move by a pitch ½ of that of the third diffraction grating G3, a brightness change for one period occurs.

In this embodiment, when the pitches of the three diffraction gratings G1, G2, and G3 are respectively represented by P1, P2, and P3, the diffraction gratings G1, G2, and G3 are designed to satisfy a condition P3=P1·P2/|P1−P2|. For example, if P1=4 μm, P2=2 μm, and P3=4 μm, an encoder with a resolution of 2 μm can be realized.

In this embodiment, an interference optical system has a very simple arrangement, and when the two diffraction gratings are formed on a single surface of a glass (scale 10), the manufacture of the diffraction gratings is facilitated. Since the diffraction gratings G1 and G2 are formed on a single surface, the parallelness between the two diffraction gratings can have remarkably high precision, and the sensitivity (S/N) of the detection signal can be improved. Thus, the influence of a mounting error between the head portion and the scale on the output can be eliminated, and the head portion and the scale can be easily mounted.

Since the diffraction gratings G1 and G2 are formed as reflection type diffraction gratings on the rear surface of the scale 10, the influence of, e.g., dust attached to the gratings on the output signal can be eliminated. Furthermore, when a portion above the gratings G1 and G2 is covered with, e.g., a cover glass, the diffraction gratings can be protected.

When the diffraction gratings G1, G2, and G3 comprise phase gratings, the depth of the grating steps of each of the diffraction gratings G1 and G2 is set to be λ/4n, and the depth of the grating steps of the diffraction grating G3 is set to be $\lambda/\{2(n-1)\}$, 0th-order diffracted light can be almost eliminated from light beams split by these diffraction gratings, and only ±1st-order diffracted light beams can be obtained (λ is the wavelength, and n is the refractive index of the grating).

Since the diffraction gratings are formed on the rear surface of the scale, the interval between the scale and the head portion can be shortened, and a further compact structure can be provided.

Figure 13:
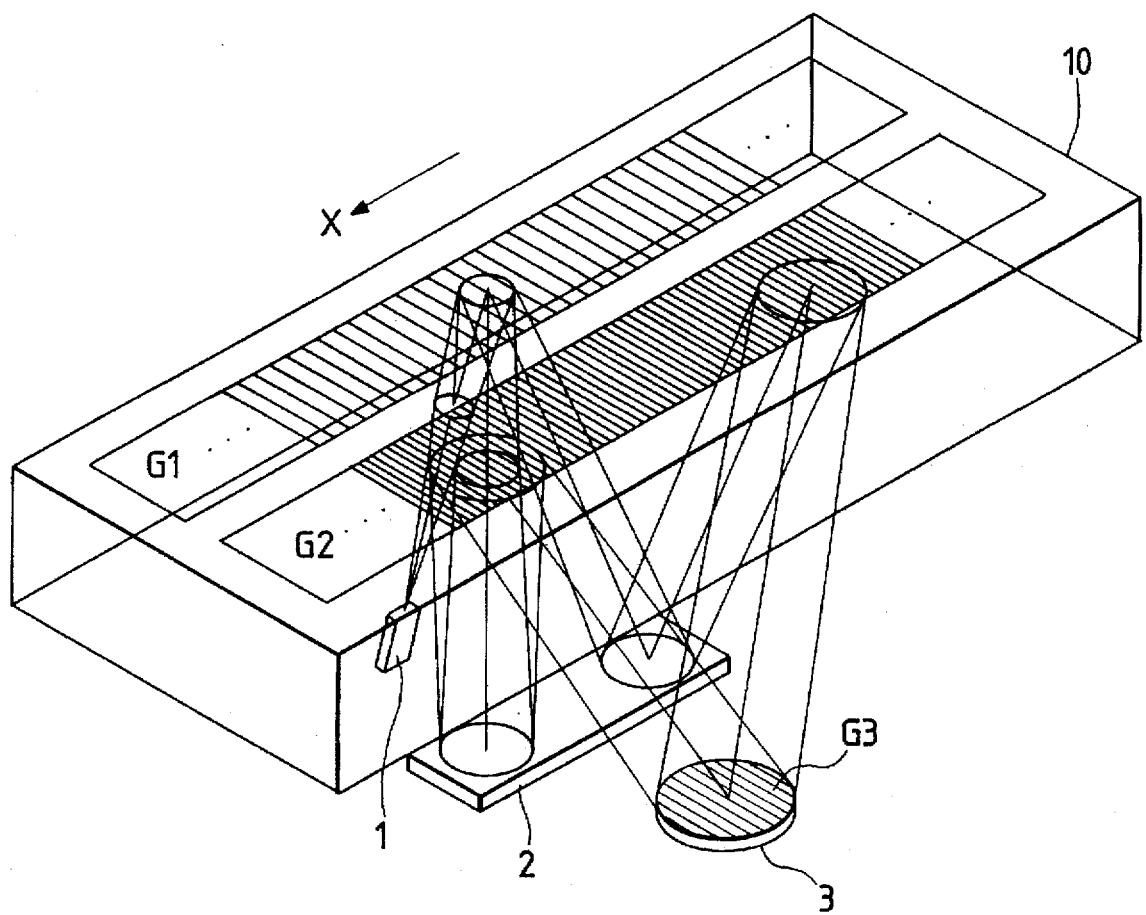
FIG. 13 is a schematic perspective view showing the seventh embodiment of the present invention.
Figure 14A:
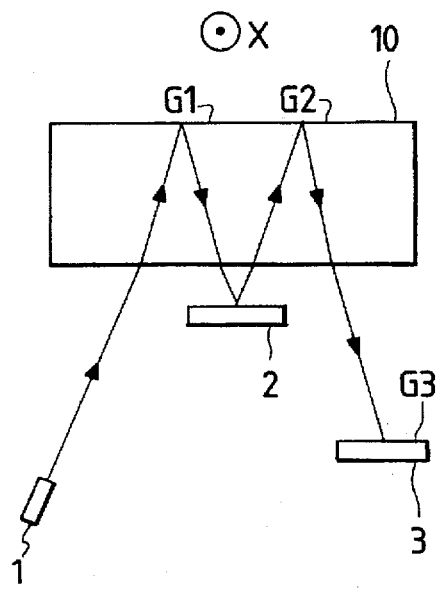
Figure 14B:
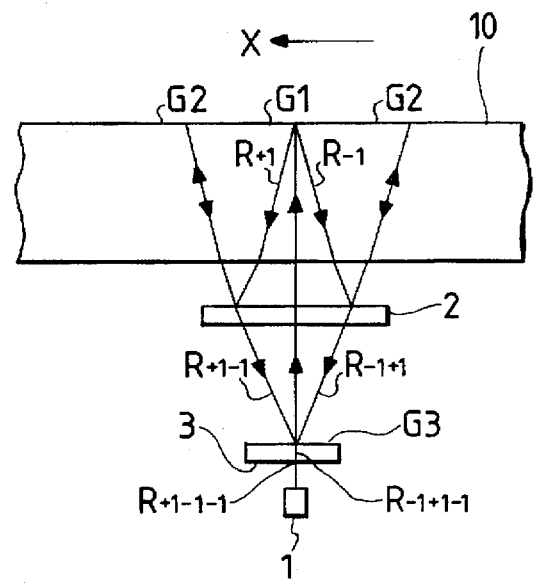

FIG. 13 is a schematic perspective view showing the seventh embodiment of the present invention, and FIGS. 14A and 14B are respectively a front view and a side view of an apparatus shown in FIG. 13.

The apparatus of this embodiment comprises a light-emitting element 1 such as a semiconductor laser, an LED, or the like, a mirror 2 separately arranged below a scale 10, a light-receiving element 3 for outputting a displacement detection signal by photoelectrically converting an interference light beam, a first diffraction grating G1 for splitting a divergent light beam emitted from the light-emitting element 1, a second diffraction grating G2, having a grating pitch different from that of the first diffraction grating G1, for deflecting the split divergent light beams by reflectively diffracting the light beams, a third diffraction grating G3, formed on a light-receiving portion of the light-receiving element 3, for synthesizing the light beams, and the scale 10 in which the first and second diffraction gratings G1 and G2 are formed on a surface, on the side opposite to the light-emitting element 1 and the light-receiving element 3, of a transparent parallel plate.

Since the basic principle for forming an interference beam in this embodiment is the same as that in the above-mentioned sixth embodiment, and can be easily understood from the optical path diagrams of FIGS. 14A and 14B, a detailed description thereof will be omitted. This embodiment can also provide the same effect as that in the sixth embodiment. It is preferable that grating pitches P1, P2, and P3 of the diffraction gratings G1, G2, and G3 satisfy a condition P3=P1·P2/|P1−P2|.

In each of the apparatuses described above with reference to FIGS. 1 to 14B, a collimator lens may be arranged between the light-emitting element 1 and the scale 10, so that divergent light emitted from the light-emitting element i is collimated by the collimator lens, and the collimated light becomes incident on the scale 10.

In each of the apparatuses described above with reference to FIGS. 1 to 14B, the third diffraction grating G3 and the light-receiving portion of the light-receiving element 3 may be separately arranged, and a focusing lens may be arranged therebetween.

The present invention includes encoders having arrangements other than those of the apparatuses described above with reference to FIGS. 1 to 14B.

FIG. 15 is a system block diagram showing a drive system using the encoder according to an embodiment as an application of the above-mentioned encoder. An encoder 101 is attached to a drive output portion of a drive means 100 having a drive source such as a motor, an actuator, an engine, or the like, or to a moving portion of an object to be driven, and detects a displacement state such as a displacement amount, a displacement velocity, or the like. The encoder comprises one of those described in the above embodiments. The detection output of this encoder 101 is fed back to a control means 102, and the control means 102 supplies a drive signal to the drive means 100, so that a state set by a set up means 103 is attained. With this feedback system, the drive state set by the set up means 103 can be obtained. The drive system can be widely applied to OA equipment such as typewriters, printers, copying machines, facsimile apparatuses, and the like; video equipment such as cameras, video apparatuses, and the like; information recording/reproduction apparatuses; robots; machine tools; manufacturing apparatuses; transport machines; and all other apparatuses having drive means.

What is claimed is:

1. A displacement detection apparatus comprising:

means for irradiating a first beam and a second beam obtained by splitting an irradiation beam onto a second diffraction grating on a substrate;

synthesizing means for synthesizing a first diffracted beam generated by said second diffraction grating upon irradiation of the first beam, and a second diffracted beam generated by said second diffraction grating upon irradiation of the second beam; and means for receiving an interference beam formed by synthesizing the first and second diffracted beams, and converting the interference beam into a signal representing a relative displacement of said substrate, wherein said irradiating means comprises a first diffraction grating formed on one of a surface of said substrate on which said second diffraction grating is formed, and another surface of said substrate parallel to the surface on which said second diffraction grating is formed, wherein said substrate is moved relative to said means for irradiating, said synthesizing means, and said means for receiving.

2. An apparatus according to claim 1, wherein the first diffracted beam includes +mth-order diffracted light, and the second diffracted beam includes −mth-order diffracted light (where m is a natural number).

3. An apparatus according to claim 1, wherein said synthesizing means comprises a third diffraction grating for achieving the synthesis.

4. An apparatus according to claim 3, wherein said second diffraction grating is designed to reflectively diffract the first and second beams, and said second diffraction grating is formed on a surface of said substrate facing said third diffraction grating.

5. An apparatus according to claim 3, wherein said second diffraction grating is designed to reflectively diffract the first and second beams, and said second diffraction grating is formed on a surface of said substrate opposite to a surface of said substrate facing said third diffraction grating.

6. An apparatus according to claim 3, wherein said second diffraction grating is designed to transmit the first and second beams, and said second diffraction grating is formed on a surface of said substrate facing said third diffraction grating.

7. An apparatus according to claim 3, wherein said second diffraction grating is designed to transmit the first and second beams, and said second diffraction grating is formed on a surface of said substrate opposite to a surface of said substrate facing said third diffraction grating.

8. An apparatus according to claim 1, wherein the first diffracted beam is +1st-order diffracted light, and the second diffracted beam is −1st-order diffracted light.

9. A displacement detection apparatus comprising:

means for irradiating a first beam and a second beam obtained by splitting an irradiation beam onto a second diffraction grating on a substrate;

synthesizing means for synthesizing a first diffracted beam generated by said second diffraction grating upon irradiation of the first beam, and a second diffracted beam generated by said second diffraction grating upon irradiation of the second beam; and means for receiving an interference beam formed by synthesizing the first and second diffracted beams, and converting the interference beam into a signal representing a relative displacement of said substrate, wherein said irradiating means comprises a first diffraction grating formed on a surface of said substrate on which said second diffraction grating is formed, or on another surface of said substrate parallel to the surface on which said second diffraction grating is formed, wherein said synthesizing means comprises a third diffraction grating for achieving the synthesis and wherein when grating pitches of said first, second and third diffraction gratings are represented by P1, P2, and P3, the grating pitches substantially satisfy a condition:

$$|P1-P2|\cdot P3 = P1\cdot P2.$$

10. A displacement detection apparatus comprising:

means for irradiating a first beam and a second beam obtained by splitting an irradiation beam onto a second diffraction grating on a substrate;

synthesizing means comprising a third diffraction grating for synthesizing a first diffracted beam generated by said second diffraction grating upon irradiation of the first beam, and a second diffracted beam generated by said second diffraction grating upon irradiation of the second beam; and means for receiving an interference beam formed by synthesizing the first and second diffracted beams, and converting the interference beam into a signal representing a relative displacement of said substrate, wherein said irradiating means comprises a first diffraction grating formed on a surface of said substrate on which said second diffraction grating is formed, or on another surface of said substrate parallel to the surface on which said second diffraction grating is formed, wherein said first and second diffraction gratings apply a phase modulated component according to said relative displacement of said substrate to at least one of said first and second diffracted beams and wherein information of said relative displacement of said substrate is obtained through a signal component according to said phase modulated component of said signal converted by said interference beam receiving means, wherein said second diffraction grating is designed to reflectively diffract the first and second beams, and said second diffraction grating is formed on a surface of said substrate facing said third diffraction grating, wherein when grating pitches of said first, second, and third diffraction gratings are represented by P1, P2, and P3, the grating pitches substantially satisfy a condition:

$$|P1-P2|\cdot P3 = P1\cdot P2.$$

11. A displacement detection apparatus comprising:

means for irradiating a first beam and a second beam obtained by splitting an irradiation beam onto a second diffraction grating on a substrate;

synthesizing means comprising a third diffraction grating for synthesizing a first diffracted beam generated by said second diffraction grating upon irradiation of the first beam, and a second diffracted beam generated by said second diffraction grating upon irradiation of the second beam; and means for receiving an interference beam formed by synthesizing the first and second diffracted beams, and converting the interference beam into a signal representing a relative displacement of said substrate, wherein said irradiating means comprises a first diffraction grating formed on a surface of said substrate on which said second diffraction grating is formed, or on another surface of said substrate parallel to the surface on which said second diffraction grating is formed, wherein said first and second diffraction gratings apply a phase modulated component according to said relative displacement of said substrate to at least one of said first and second diffracted beams and wherein information of said relative displacement of said substrate is obtained through a signal component according to said phase modulated component of said signal converted by said interference beam receiving means, wherein said second diffraction grating is designed to reflectively diffract the first and second beams, and said second diffraction grating is formed on a surface of said substrate opposite to a surface of said substrate facing said third diffraction grating, wherein when grating pitches of said first, second, and third diffraction gratings are represented by P1, P2, and P3, the grating pitches substantially satisfy a condition:

$$|P1-P2|\cdot P3 = P1\cdot P2.$$

12. A displacement detection apparatus comprising:

means for irradiating a first beam and a second beam obtained by splitting an irradiation beam onto a second diffraction grating on a substrate;

synthesizing means comprising a third diffraction grating for synthesizing a first diffracted beam generated by said second diffraction grating upon irradiation of the first beam, and a second diffracted beam generated by said second diffraction grating upon irradiation of the second beam; and means for receiving an interference beam formed by synthesizing the first and second diffracted beams, and converting the interference beam into a signal representing a relative displacement of said substrate, wherein said irradiating means comprises a first diffraction grating formed on a surface of said substrate on which said second diffraction grating is formed, or on another surface of said substrate parallel to the surface on which said second diffraction grating is formed, wherein said first and second diffraction gratings apply a phase modulated component according to said relative displacement of said substrate to at least one of said first and second diffracted beams and wherein information of said relative displacement of said substrate is obtained through a signal component according to said phase modulated component of said signal converted by said interference beam receiving means, wherein said second diffraction grating is designed to transmit the first and second beams, and said second diffraction grating is formed on a surface of said substrate facing said third diffraction grating, wherein when grating pitches of said first, second, and third diffraction gratings are represented by P1, P2, and P3, the grating pitches substantially satisfy a condition:

$$|P1-P2|\cdot P3 = P1 P2.$$

13. A displacement detection apparatus comprising:

means for irradiating a first beam and a second beam obtained by splitting an irradiation beam onto a second diffraction grating on a substrate;

synthesizing means comprising a third diffraction grating for synthesizing a first diffracted beam generated by said second diffraction grating upon irradiation of the first beam, and a second diffracted beam generated by said second diffraction grating upon irradiation of the second beam; and means for receiving an interference beam formed by synthesizing the first and second diffracted beams, and converting the interference beam into a signal representing a relative displacement of said substrate, wherein said irradiating means comprises a first diffraction grating formed on a surface of said substrate on which said second diffraction grating is formed, or on another surface of said substrate parallel to the surface on which said second diffraction grating is formed, wherein said first and second diffraction gratings apply a phase modulated component according to said relative displacement of said substrate to at least one of said first and second diffracted beams and wherein information of said relative displacement of said substrate is obtained through a signal component according to said phase modulated component of said signal converted by said interference beam receiving means, wherein said second diffraction grating is designed to transmit the first and second beams, and said second diffraction grating is formed on a surface of said substrate opposite to a surface of said substrate facing said third diffraction grating, wherein when grating pitches of said first, second, and third diffraction gratings are represented by P1, P2, and P3, the grating pitches substantially satisfy a condition:

$$|P1-P2|\cdot P3=P1\cdot P2.$$

14. A drive system comprising a displacement detection apparatus comprising:

means for irradiating a first beam and a second beam obtained by splitting an irradiation beam onto a second diffraction grating on a substrate;

synthesizing means for synthesizing a first diffracted beam generated by said second diffraction grating upon irradiation of the first beam, and a second diffracted beam generated by said second diffraction grating upon irradiation of the second beam; and means for receiving an interference beam formed by synthesizing the first and second diffracted beams, and converting the interference beam into a signal representing a relative displacement of said substrate, wherein said irradiating means comprises a first diffraction grating formed on one of a surface of said substrate on which said second diffraction grating is formed, and another surface of said substrate parallel to the surface on which said second diffraction grating is formed, wherein said substrate is moved relative to said means for irradiating, said synthesizing means, and said means for receiving.

15. A drive system according to claim 14, wherein the first diffracted beam includes +mth-order diffracted light, and the second diffracted beam includes −mth-order diffracted light (where m is a natural number).

16. A drive system according to claim 14, wherein said synthesizing means comprises a third diffraction grating for achieving the synthesis.

17. A drive system according to claim 16, wherein said second diffraction grating is designed to reflectively diffract the first and second beams, and said second diffraction grating is formed on a surface of said substrate facing said third diffraction grating.

18. A drive system according to claim 16, wherein said second diffraction grating is designed to reflectively diffract the first and second beams, and said second diffraction grating is formed on a surface of said substrate opposite to a surface of said substrate facing said third diffraction grating.

19. A drive system according to claim 16, wherein said second diffraction grating is designed to transmit the first and second beams, and said second diffraction grating is formed on a surface of said substrate facing said third diffraction grating.

20. A drive system according to claim 16, wherein said second diffraction grating is designed to transmit the first and second beams, and said second diffraction grating is formed on a surface of said substrate opposite to a surface of said substrate facing said third diffraction grating.

21. A drive system comprising:

means for irradiating a first beam and a second beam obtained by splitting an irradiation beam onto a second diffraction grating on a substrate;

synthesizing means for synthesizing a first diffracted beam generated by said second diffraction grating upon irradiation of the first beam, and a second diffracted beam generated by said second diffraction grating upon irradiation of the second beam; and means for receiving an interference beam formed by synthesizing the first and second diffracted beams, and converting the interference beam into a signal representing a relative displacement of said substrate, wherein said irradiating means comprises a first diffraction grating formed on a surface of said substrate on which said second diffraction grating is formed, or on another surface of said substrate parallel to the surface on which said second diffraction grating is formed, wherein said synthesizing means comprises a third diffraction grating for achieving the synthesis and wherein when grating pitches of said first, second, and third diffraction gratings are represented by P1, P2, and P3, the grating pitches substantially satisfy a condition:

$$|P1-P2|\cdot P3=P1\cdot P2.$$

22. A drive system comprising a displacement detection apparatus comprising:

means for irradiating a first beam and a second beam obtained by splitting an irradiation beam onto a second diffraction grating on a substrate;

synthesizing means comprising a third diffraction grating for synthesizing a first diffracted beam generated by said second diffraction grating upon irradiation of the first beam, and a second diffracted beam generated by said second diffraction grating upon irradiation of the second beam; and means for receiving an interference beam formed by synthesizing the first and second diffracted beams, and converting the interference beam into a signal representing a relative displacement of said substrate, wherein said irradiating means comprises a first diffraction grating formed on a surface of said substrate on which said second diffraction grating is formed, or on another surface of said substrate parallel to the surface on which said second diffraction grating is formed, wherein said first and second diffraction gratings apply a phase modulated component according to said relative displacement of said substrate to at least one of said first and second diffracted beams and wherein information of said relative displacement of said substrate is obtained through a signal component according to said phase modulated component of said signal converted by said interference beam receiving means, wherein said second diffraction grating is designed to reflectively diffract the first and second beams, and said second diffraction grating is formed on a surface of said substrate facing said third diffraction grating, wherein when grating pitches of said first, second, and third diffraction gratings are represented by P1, P2, and P3, the grating pitches substantially satisfy a condition:

$$|P1-P2| \cdot P3 = P1 \cdot P2.$$

23. A displacement detecting apparatus comprising:

light source means for generating a source light beam;

scale means, said scale means comprising a transparent member, a first diffraction grating provided on a surface of said transparent member, and a second diffraction grating provided on one of said surface and a surface different from said surface, wherein said source light beam from said light source means is divided into a first light beam and a second light beam by said first diffraction grating, and after said first and second light beams traverse said transparent member, said first and second light beams are respectively diffracted by said second diffraction grating to generate a first diffracted light beam and a second diffracted light beam;

synthesizing means for synthesizing an interference light beam from said first diffracted light beam and said second diffracted light beam; and optical receiving means for optically receiving said interference light beam, and generating from said received interference light beam a signal indicating a relative displacement of an object to said transparent member, wherein said scale means is moved relative to said light source means, said synthesizing means, and said optical receiving means.

* * * * *

UNITED STATES PATENT AND TRADEMARK OFFICE
CERTIFICATE OF CORRECTION

PATENT NO. : 5,680,211  
DATED : October 21, 1997  
INVENTOR(S) : Kaneda et al.

Page 1 of 2

It is certified that error appears in the above-identified patent and that said Letters Patent is hereby corrected as shown below:

On the title page:

[56] References Cited

FOREIGN PATENT DOCUMENTS

"1307926  12/1989  Japan" should read  
--1-307926  12/1989  Japan--.

COLUMN 5:

Line 67, "i" should read --1--.

COLUMN 6:

Line 11, "R+i" should read --R+1--;

COLUMN 7:

Line 12, "I" should read --1--.

COLUMN 8:

Line 16, "30 1st-order" should read --+1st-order--; and  
Line 17, "10" should be deleted.

UNITED STATES PATENT AND TRADEMARK OFFICE
CERTIFICATE OF CORRECTION

PATENT NO. : 5,680,211
DATED : October 21, 1997
INVENTOR(S) : Kaneda et al.

It is certified that error appears in the above-identified patent and that said Letters Patent is hereby corrected as shown below:

COLUMN 9:

Line 42, "i" should read --1--.

COLUMN 12:

Line 67, "$|P1-P2| \cdot P3=P1P2.$" should read

--$|P1-P2| \cdot P3=P1 \cdot P2.$--

COLUMN 14:

Line 25, "substrate:" should read --substrate;--.

Signed and Sealed this

Twenty-sixth Day of May, 1998

Attest:

BRUCE LEHMAN

*Attesting Officer*   *Commissioner of Patents and Trademarks*